United States Patent
Soechting et al.

(10) Patent No.: US 6,722,138 B2
(45) Date of Patent: Apr. 20, 2004

(54) VANE PLATFORM TRAILING EDGE COOLING

(75) Inventors: Friedrich O. Soechting, Tequesta, FL (US); Alan D. Bessette, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 468 days.

(21) Appl. No.: 09/736,030

(22) Filed: Dec. 13, 2000

(65) Prior Publication Data

US 2003/0167775 A1 Sep. 11, 2003

(51) Int. Cl.[7] ................................................. F02C 7/12
(52) U.S. Cl. ............................................. 60/785; 60/806
(58) Field of Search ........................... 60/782, 785, 806; 415/115, 116, 117

(56) References Cited

U.S. PATENT DOCUMENTS

| | | | | |
|---|---|---|---|---|
| 4,466,239 A | * | 8/1984 | Napoli et al. | 60/806 |
| 5,252,026 A | * | 10/1993 | Shepherd | 415/115 |
| 5,402,636 A | * | 4/1995 | Mize et al. | 60/806 |
| 6,226,975 B1 | * | 5/2001 | Ingistov | 60/806 |

* cited by examiner

*Primary Examiner*—Louis J. Casaregola
(74) *Attorney, Agent, or Firm*—Norman Friedland

(57) ABSTRACT

The compressor discharge air that normally leaks from the high pressure compressor hub and a portion of the compressor discharge air that is utilized for component cooling, is re-routed to by-pass the engine's TOBI to flow into a manifold defined by the stator support structure and a foot of the first turbine vane to the inner diameter platform of the first turbine vane of the high pressure turbine section to cool the aft end thereof before being discharged into the engine's main gaseous stream.

2 Claims, 3 Drawing Sheets

VANE PLATFORM TRAILING EDGE COOLING

TECHNICAL FIELD

This invention relates to cooling the vane of a gas turbine engine and particularly to cooling the trailing edge of the platform of the vane that is mounted ahead of and adjacent to the high pressure turbine.

BACKGROUND OF THE INVENTION

As one skilled in the aeronautical gas turbine engine technology recognizes, the air discharging from the compressor section is typically utilized for cooling engine components located downstream of the compressor. It is abundantly important in designing gas turbine engines that the compressor air be used conservatively so that the quantity of air used for cooling matches the cooling demand of the component being cooled. In other words, any excessive air utilized for cooling results in a deficit to engine performance.

The problem that this invention solved is where air taken from the compressor, particularly the air that is taken off the root of the compressor blades is utilized in cooling certain parts and since this air is hotter than other portions of the air taken off lower stations in the compressor, it is typically dumped into the engine's gas stream that constitutes the working medium of the engine. The air could be used for turbine blade cooling, however, the additional temperature rise associated with the pump work makes this a very unattractive option because no performance benefit would be achieved. Hence, the compressor hub leakage air together with the cooling air is dumped through the sealing system into the cavity that is located at the front of the high pressure turbine. It is obvious, that under these circumstances, this air is not utilized to its maximum potential for cooling purposes since it is dumped prior to when it could be utilized for cooling other components of the engine. Heretofore, cooling of the leading and trailing edges of the inner diameter platform of the vane was by utilizing additional cooling air that discharges from the compressor and routed to the inner diameter liner of the combustor.

This invention contemplates utilizing the compressor discharge air that was heretofore dumped in the engine's fluid working medium to cool the trailing edge of the inner platform of the high pressure turbine vane by judiciously and discretely routing the hub leakage and compressor cooling air through the support structure to bypass the path that is utilized to dump this air into the engine's fluid working medium.

SUMMARY OF THE INVENTION

An object of this invention is to provide an improved cooling of the vane of a gas turbine engine by utilizing the heretofore compressor hub leakage and cooling air that was dumped into the engine's fluid working medium.

A feature of this invention is to judiciously route the compressor leakage and cooling air so as to cool the trailing edge of the platform of the high pressure turbine vane of a gas turbine engine.

The foregoing and other features of the present invention will become more apparent from the following description and accompanying drawings.

Figure 1:
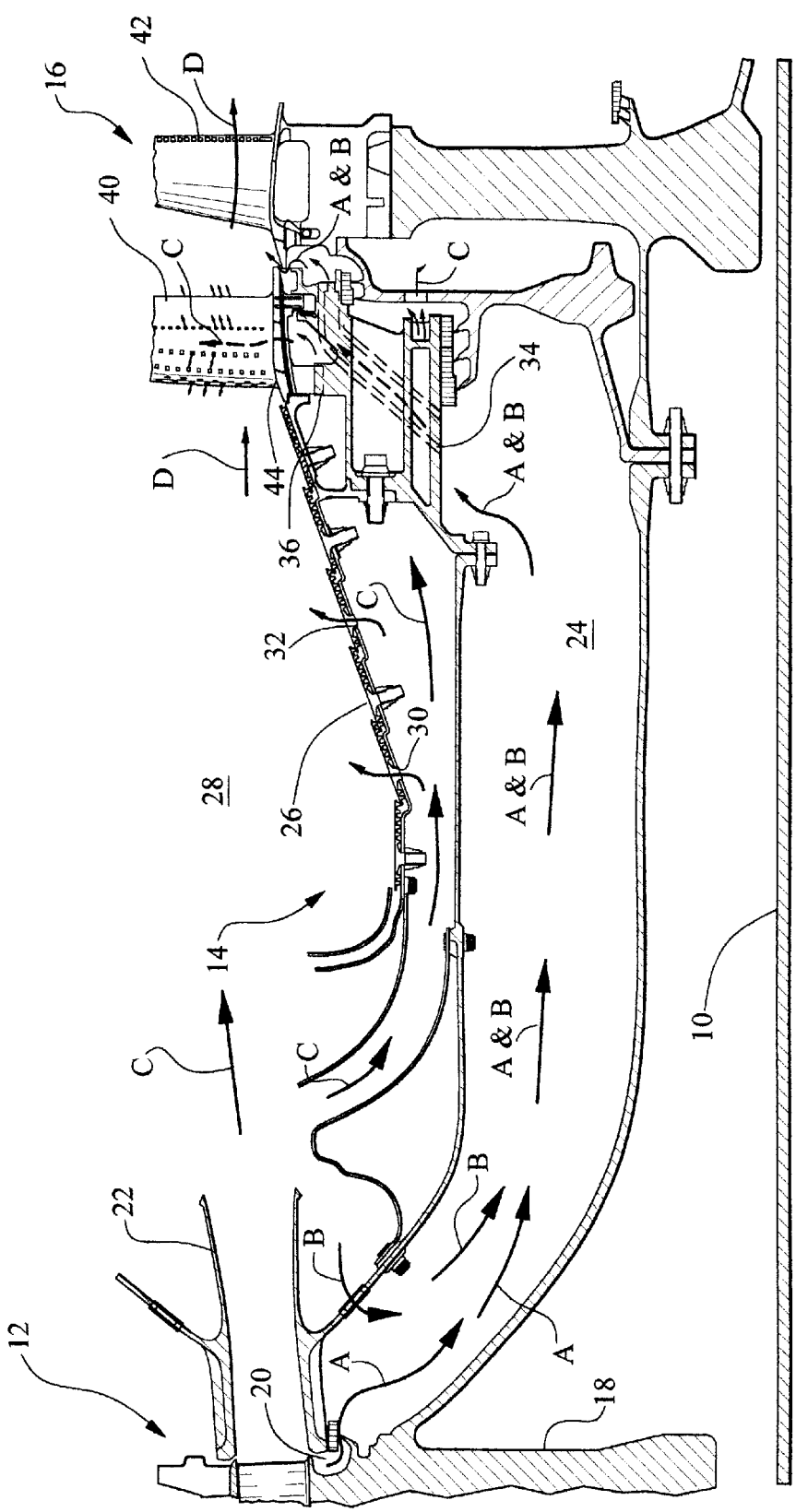
FIG. 1 is partial sectional view of a portion of a prior art gas turbine engine depicting the cooling flow for cooling engine components downstream of the compressor.

These figures merely serve to further clarity and illustrate the present invention and are not intended to limit the scope thereof

DETAILED DESCRIPTION OF THE INVENTION

This invention relates to a twin spool axial flow gas turbine engine of the type manufactured by Pratt & Whitney, a division of United Technologies Corporation and for details of these types of engines reference should be made to the F-100 and F-119 engines as well as the patents being described immediately hereinbelow. As one skilled in this art will appreciate, the performance and thrust capabilities of a gas turbine engine is enhanced by operating the power turbines at as high a temperature as is possible. To achieve this end, the technology has advanced the cooling techniques so that the amount of cooling is proportional to maintaining the structural integrity without sacrificing performance. The engines being described in connection with this invention tap the compressor air for cooling the hot section of the engine and obviously, since energy has been provided to this air by the engine, it is abundantly important that this air is used in the most prudent way. As indicated in the above, heretofore designs have consistently dumped the air leaking from the labyrinth seal adjacent to the last stage of the high pressure compressor and the partially spent cooling air taken from the compressor that cools the compressor hub, into the front of the high pressure turbine. Obviously, since the air is being put back into the stream of the engine's working medium some of the energy of this partially spent air is utilized for creating thrust. However, according to this invention, this air contains a given amount of cooling capacity and the judicious routing of thereof serves to cool the aft end of the first vane of the high pressure turbine which further enhances the performance of the engine.

U.S. Pat. No. 6,067,032 granted to Anderson, Jr. et al on May 23, 2000 and entitled "Method of Detecting Stalls In A Gas Turbine Engine" discloses schematically the types of engine to which this invention pertains. As noted, it is a twin spool axial flow engine with a low pressure and high pressure compressor sections mounted downstream of a fan mounted in the front end of the engine. A high pressure turbine and a low pressure turbine serve to power these compressors respectively and the energy remaining is in the gas stream serves to generate thrust in the engine. As is typical, a burner which in this instance is an annular type serves to add heat to the compressed air for creating the gas stream that serves as the engine's working medium.

U.S. Pat. No. 5,127,794 granted to Burge et al on Jul. 7, 1992 and entitled "Compressor Case with Controlled Thermal Environment" discloses a partial sectional view illustrating the compressor sections of a prior art gas turbine engine where the air is compressed and a portion thereof is bled for cooling purposes. U.S. Pat. No. 5,297,385 granted to Dubell et al on Mar. 29, 1994 disclosed a sectional view of the combustion section that receives the air discharging from the compressor where a portion of the air is routed internal of the combustor for providing oxygen for the burning fuel that accelerates the gases that are fed to power the turbine, and a portion is routed to the hot section of the engine for cooling purposes. U.S. Pat. No. 4,822,244 granted to Maier et al on Apr. 18, 1989 discloses a TOBI (tangential on board injector) that serves to provide cooling of the turbine disk which shows the station of the gas turbine engine to which this invention pertains. The aforementioned patents are commonly assigned to the assignee of this patent application and are incorporated herein by reference. Hence, for details of the type of engine to which this invention pertains, reference should be made to these patents. Suffice it to say that a portion of the air leaking from the compressor hub and a portion of the cooling air bled from the compressor is utilized for cooling the aft end of the first turbine vane platform as will be described in further detail hereinbelow.

Figure 2:
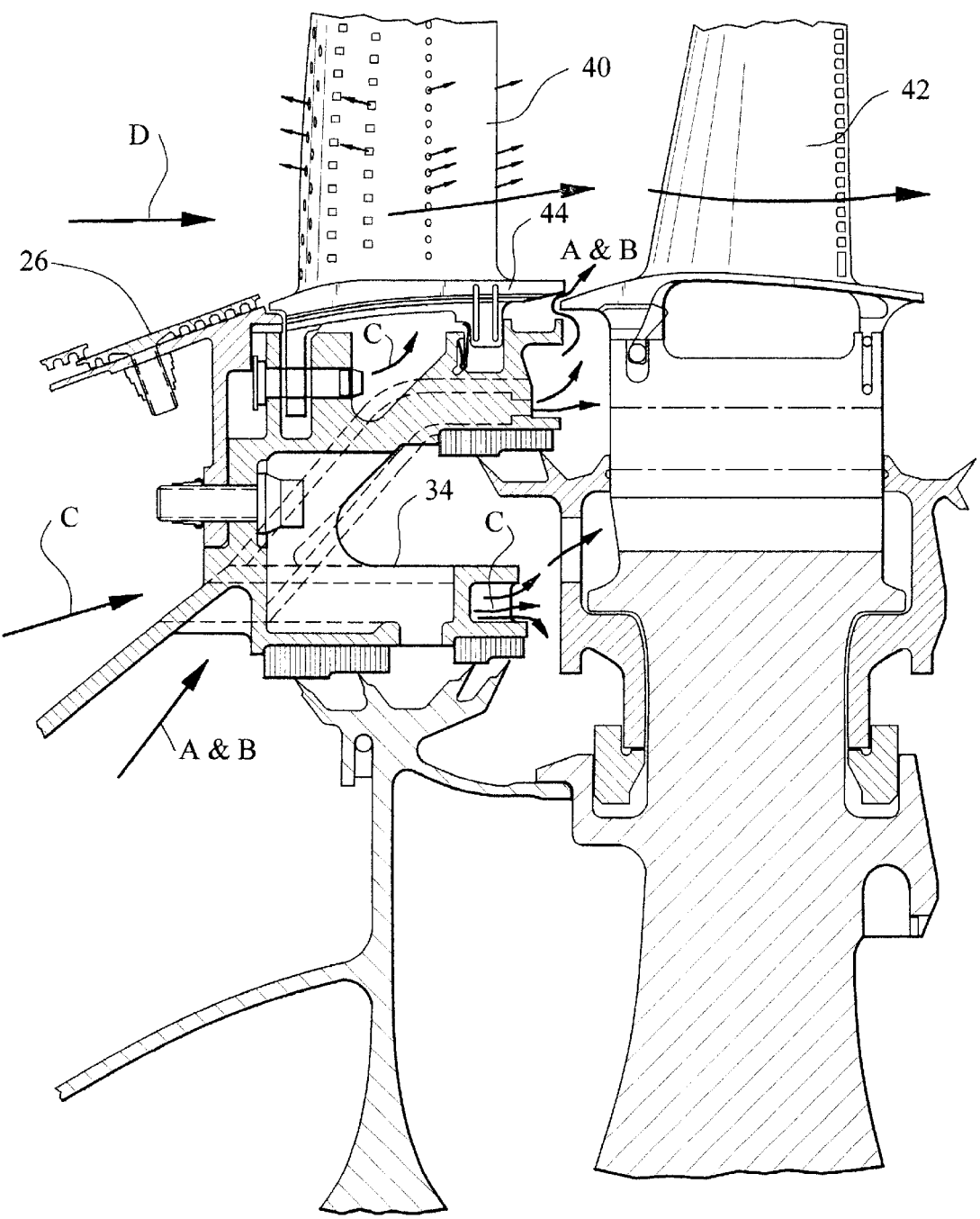
FIG. 2 is a fragmentary enlarged view of the portion of the prior art gas turbine engine depicted in FIG. 1 illustrating the routing of the cooling air in proximity to the first turbine.
Figure 3:
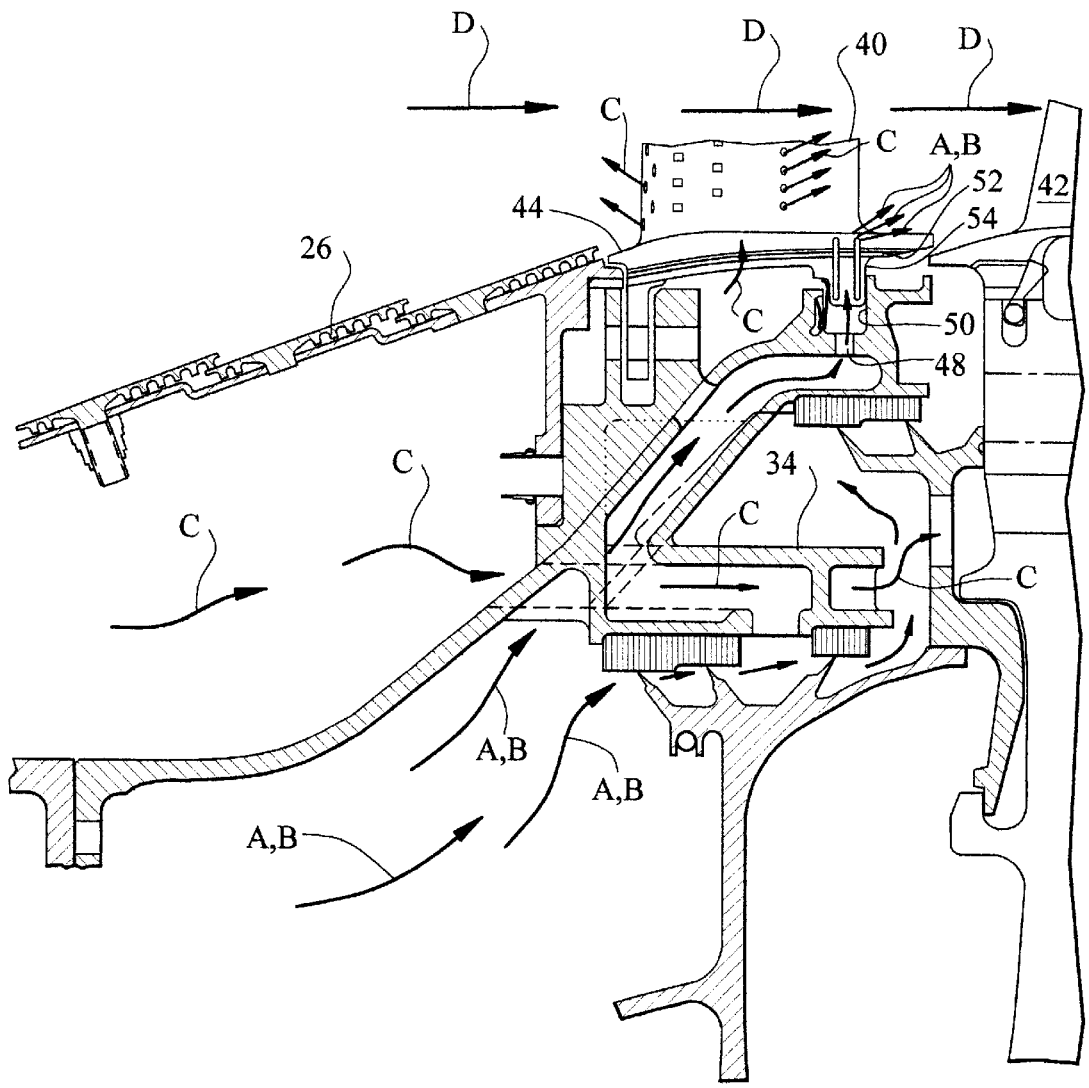
FIG. 3 is an enlarged view of the gas turbine engine depicted in FIG. 1 with the modification thereof in accordance with this invention.

To better understand this invention reference will be made to FIGS. 1 and 2 which partially show the prior art gas turbine engine comprising the engine case 10 housing the high pressure compressor 12, the combustor 14 and the high pressure turbine section 16. As noted the compressor disk 18 of the high pressure compressor 12 includes a labyrinth seal 20 and as shown by arrow A, a portion of the compressor high pressure air leaks therethrough. Additionally, immediately downstream of the diffuser 22 a portion of the compressor discharge air illustrated by arrow B is bled into the annular passage 24 defined between the combustor casing 24 and the compressor hub. The remaining portion of the cooling air represented by arrows C is distributed to the combustion zone 28 through the front end of the combustor (not shown) and the dilution holes 30 and combustion holes 32 and through the TOBI 34. As noted from FIGS. 1 and 2, the portion of compressor discharge air leaking from the labyrinth seal 20 of the high pressure compressor hub of the high pressure compressor 12 (arrow A) and the cooling air discharging from the compressor (arrow B) are routed to cool the stator support structure 36 and then discharged into the engine's gas stream, represented by arrow D, through the aperture 38 and between the aft end of vane 40 and the first turbine blade 42. It is apparent from the foregoing that the cooling air represented by arrows A and B short circuits the aft end of the platform 44 of the vane 40.

In accordance with this invention, the compressor discharge air represented by A and B is redirected through aperture 48 into the manifold 50 defined between the foot 54 at the root of vane 40 and the stator support structure 36 and then directed to the aft end 52 of the inside diameter platform 44 and then discharges into the engine's gas stream D. This additional cooling of what otherwise would be spent cooling air not only cools an otherwise extremely hot portion of the stator, but enhances engine performance and increases the longevity of this particular part.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. For a gas turbine engine that includes a high pressure compressor, a high pressure turbine driving said high pressure compressor and a high pressure vane, static support structure supporting said vane ahead of the high pressure turbine, said compressor including a hub and a seal operatively connected to said hub for sealing the engine's gases from leaking, said vane including a platform having an aft end relative to the flow of the turbine engine's working medium, a portion of compressor air leaking from said high pressure compressor and a portion the cooling air being discharged from the compressor being routed to cool said static support structure, and a portion of said air leaking from said high pressure compressor and a portion the cooling air being discharged from the compressor routed through said support structure to the aft end of said platform before being discharged into the turbine engine's working medium, wherein said vane includes a rear foot supported in a cavity formed in said support structure and said rear foot and said support structure defining a manifold and said portion of said air leaking from said high pressure compressor and said portion the cooling air being discharged from the compressor being routed into said manifold before being routed to said aft end of said platform.

2. Cooling means for a gas turbine engine, said gas turbine engine including a high pressure compressor, a high pressure turbine driving said high pressure compressor and a high pressure vane, static support structure supporting said vane ahead of the high pressure turbine for directing gas turbine engine's working medium into said high pressure turbine, said compressor including a hub and a seal operatively connected to said hub for sealing the engine's gases from leaking, said vane including a platform having an aft end relative to the flow of the turbine engine's working medium, a portion of compressor air leaking from said seal of said hub of said high pressure compressor and a portion the cooling air being discharged from the compressor being routed to cool said static support structure, said vane includes a depending foot supported in a cavity formed in said support structure and said depending foot and said support structure defining a manifold and said portion of said air leaking from said high pressure compressor and said portion of the cooling air being discharged from the compressor being routed into said manifold and then to said aft end of said platform before being discharged into the gas turbine engine's working medium.

* * * * *